(12) United States Patent
Spingler et al.

(10) Patent No.: US 8,457,918 B2
(45) Date of Patent: Jun. 4, 2013

(54) METHOD AND DEVICE FOR ESTIMATING THE TEMPERATURE SENSED UPON CONTACT WITH A SURFACE

(75) Inventors: Mark René Spingler, Elsdorf (DE); Alexander van Laack, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 12/984,549

(22) Filed: Jan. 4, 2011

(65) Prior Publication Data
US 2011/0166815 A1 Jul. 7, 2011

(30) Foreign Application Priority Data
Jan. 6, 2010 (DE) .......................... 10 2010 000 701

(51) Int. Cl.
*G01K 15/00* (2006.01)
(52) U.S. Cl.
USPC ................ 702/99; 374/30; 374/40; 374/102; 374/132
(58) Field of Classification Search
USPC ............................................... 702/99; 399/69
See application file for complete search history.

(56) References Cited

U.S. PATENT DOCUMENTS

| | | | | |
|---|---|---|---|---|
| 5,653,539 A | * | 8/1997 | Rosengaus | 374/159 |
| 7,220,536 B2 | * | 5/2007 | Kuwano et al. | 430/348 |
| 7,445,884 B2 | * | 11/2008 | Yanagisawa | 430/350 |
| 7,744,274 B1 | * | 6/2010 | Grek et al. | 374/124 |
| 8,256,953 B2 | * | 9/2012 | Yuhas et al. | 374/30 |
| 2004/0087841 A1 | * | 5/2004 | Braig et al. | 600/310 |
| 2006/0151533 A1 | * | 7/2006 | Simunovic et al. | 222/150 |
| 2006/0210294 A1 | * | 9/2006 | Sone et al. | 399/69 |
| 2007/0086504 A1 | * | 4/2007 | Chang | 374/43 |
| 2009/0263870 A1 | * | 10/2009 | Pipper et al. | 435/91.2 |

FOREIGN PATENT DOCUMENTS

DE 3901377 A1 8/1989

* cited by examiner

*Primary Examiner* — Michael Nghiem
*Assistant Examiner* — Corey Bailey
(74) *Attorney, Agent, or Firm* — Damian Porcari; Brooks Kushman P.C.

(57) ABSTRACT

A method and apparatus for estimating the temperature sensed upon contact with a surface. The method includes contactless heating of the surface, contactless measurement of a time change in temperature of the surface, and estimation of the temperature sensed upon contact with the surface on the basis of this time change in temperature.

9 Claims, 6 Drawing Sheets a)

b)

a)

b)

c)

d)

METHOD AND DEVICE FOR ESTIMATING THE TEMPERATURE SENSED UPON CONTACT WITH A SURFACE

CROSS-REFERENCE TO RELATED APPLICATIONS

This application claims foreign priority benefits under 35 U.S.C. §119(a)-(d) to DE 10 2010 000 701.3 filed Jan. 6, 2010, which is hereby incorporated by reference in its entirety.

BACKGROUND

1. Technical Field

The invention relates to a method and a device for estimating the temperature sensed upon contact with a surface.

2. Background Art

The measurement and/or estimation of the contact temperature of a surface can be required, for example, in order to be able to make a quantitative estimate of the visible and palpable authenticity and/or genuineness of materials. The so-called heat penetration coefficient can be determined here as a characteristic parameter. Materials with a high heat penetration coefficient (metals, for example) are felt or sensed (by a person touching a surface of the material) to be particularly cold when the temperature of the material is lower than that of the skin of the person touching the material. Materials with a low heat penetration coefficient (insulating materials or wood, for example) are felt/sensed to be warmer when in contact with skin, even if the temperature of the material is actually the same as for a material having a higher heat penetration coefficient. Currently, this heat penetration coefficient is usually only determined on test materials in large scale machines.

In some applications, such as in motor vehicles, however, there is a need to estimate the temperature sensed upon contact with different materials, particularly materials present in the vehicle interior, and/or to estimate the heat penetration coefficient of the materials present in the vehicle interior in a non-destructive, contactless fashion as well as independently of the surface configuration. At the same time, the size of the measuring device used for this purpose should be such that the measuring device can be effectively manipulated in relatively small confines, such as the interior of a motor vehicle, and preferably by an industrial robotic device.

DE 39 01 377 A1 discloses a method for determining thermal conductivity on the basis of measurements of thermoelectric voltage by means of an actuator/sensor system on a material in which a temperature gradient has been produced. In the disclosed method, the required temperature difference is produced by an actuator operated as a Peltier element in a first operating mode. The feeding and discharging of the current-proportional Peltier heat is interrupted briefly and periodically, the actuator operating during these interruptions as a sensor, which detects the instantaneous thermoelectric voltage proportional to the temperature difference, by being switched over electronically to a second operating mode.

SUMMARY

In an embodiment disclosed herein, a method for estimating the temperature sensed upon contact with a surface comprises contactlessly heating the surface, contactlessly measuring a time change in temperature of the surface, and using the measured time change in temperature to estimate the temperature sensed upon contact.

Because the disclosed method operates in a contactless and nondestructive fashion, no permanent changes are made to the surface to be examined, and also no residues exist, and so the method is also suitable for use in comparative studies and/or benchmark tests. The disclosed method enables the temperature sensed by humans to be estimated in a fashion that is nondestructive and capable of mobile use, for a wide multiplicity of surfaces and/or materials such as, for example, metal, wood, plastic, foam plastic, etc.

Various types of contactless technologies for heating the surface can be used in the disclosed method. Examples of contactless heating technologies may include, for example, the use of halogen light, infrared light, light from a laser light source, or thermal conduction (via the circulation of heated air, for example by means of a fan).

Diverse modifications can be used to normalize the surface in order to ensure that the results attained by means of the disclosed method can be objectively compared and are independent of the particular surface configuration. In particular, they are independent of the color and/or of the transmission behavior of the surface. These modifications can comprise the use of a heat transfer paste, of stickers or tapes with a special transmission behavior, the use of a suitable liquid (for example with two partial volumes of matt black color and one partial volume of isopropanol), or the use of carbon black particles that can be stored in Teflon filters and be transferred therefrom onto the respective samples, and can also be combined with one another in a suitable, compact way such that the modification and/or normalization can be applied both in the laboratory and also in a mobile fashion (for example in a measuring robot).

In one disclosed embodiment, the step of heating the surface comprises a cyclical pulsed heating of the surface. It is thereby possible to distinguish different surfaces and/or materials with a resolution that is higher than is possible with a constant, uniform heating, since the functions and/or measurement curves which are respectively obtained and describe the time dependence of the temperature change differ from one another not only in the gradient (the respective regression line), but also in the individual temperature decay curves produced by the cycles of pulsed heating.

In one embodiment, the step of estimating the temperature sensed upon contact with the surface comprises the determination of a parameter vl that is given by $$vl = \frac{1}{m \cdot a},$$

with m denoting the gradient of a regression line determined for the function describing the time dependence of the temperature change, and a denoting the mean amplitude of the temperature decay curves in this function as are produced by the cycles of pulsed heating.

In accordance with one embodiment, the step of the estimation of the temperature sensed upon contact with the surface is performed on the basis of a calibration in which the above-named parameter (vl) is determined for a plurality of reference surfaces.

In accordance with one embodiment, this calibration comprises the assignment of the parameters (vl), determined for the plurality of reference surfaces, to a respective value, known for this reference surface, of the heat penetration coefficient.

In accordance with a further embodiment, apparatus for estimating the temperature sensed upon contact with a surface comprises a heat source for contactless heating of the surface, a thermometer for contactless measurement of the temperature of the surface, and an evaluation unit that determines a parameter characteristic of the temperature sensed upon contact with the surface on the basis of a time change in the temperature of the surface caused by the heating.

In accordance with one embodiment, the device is designed for the pulsed heating of the surface by the heat source. For this purpose, the apparatus may include a rotatable screen provided with at least one opening, it being possible to apply thermal energy to the surface through the opening.

BRIEF DESCRIPTION OF THE DRAWINGS

Embodiments of the present invention will now be described by way of example only with reference to the accompanying drawings in which:

FIG. 1a is a schematic general arrangement front view of a measuring arrangement in accordance with one embodiment of the invention;

FIG. 1b is a schematic side view of the apparatus of FIG. 1a;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
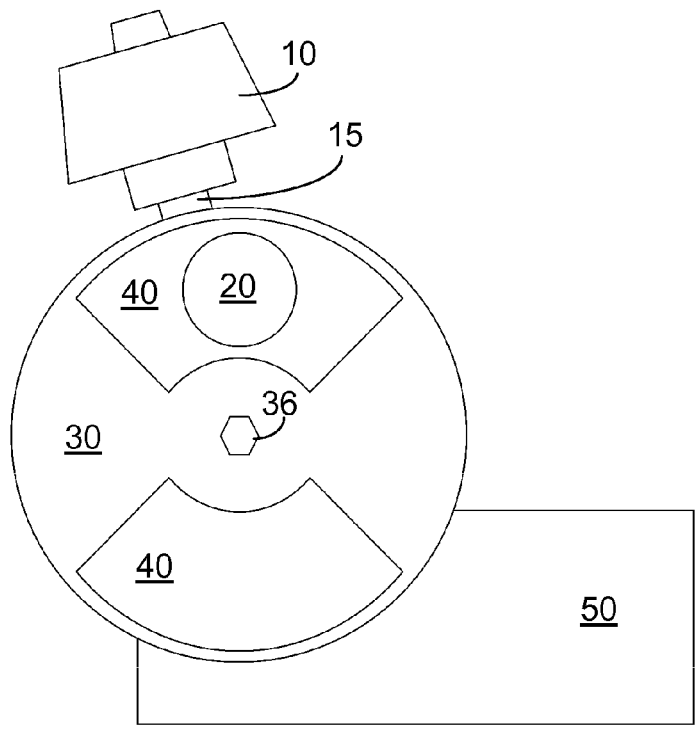
Figure 1:
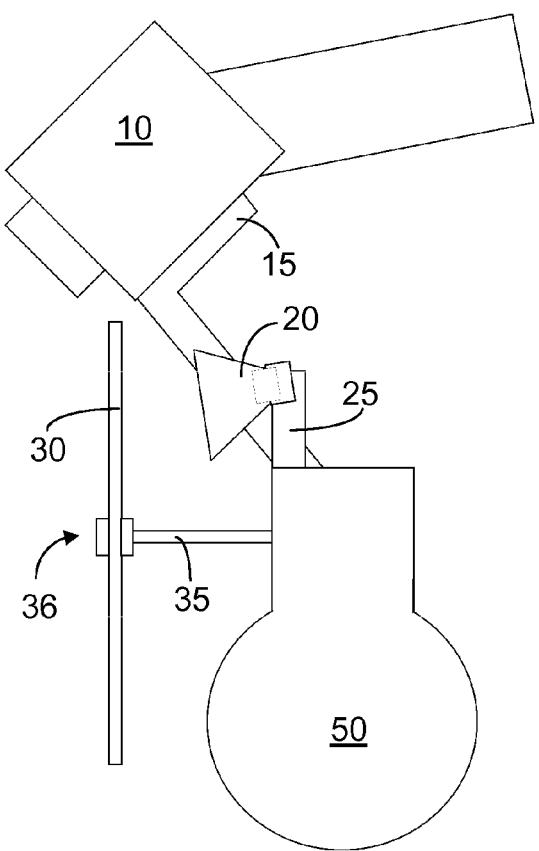

As seen in FIGS. 1a and 1b, a heat source 20 and a non-contact (infrared-sensing, for example) thermometer 10 are held by a support 15. Heat source 20 may, for example, be a halogen lamp. Contactless heating may be achieved by means of an infrared lamp, an incandescent lamp, a laser light source, or by of a fan or a controllable hot air blower.

Heat source 20 is held in a support 25 that is fixed (for example screwed) on the housing of an electric motor 50. A shaft 35 of the electric motor 50 is fixed via a screw and nut connection 36 on a rotatable disk or screen 30 which has openings 40 for the passage of light and/or heat and is, moreover, substantially impermeable to heat and/or light.

Figure 2:
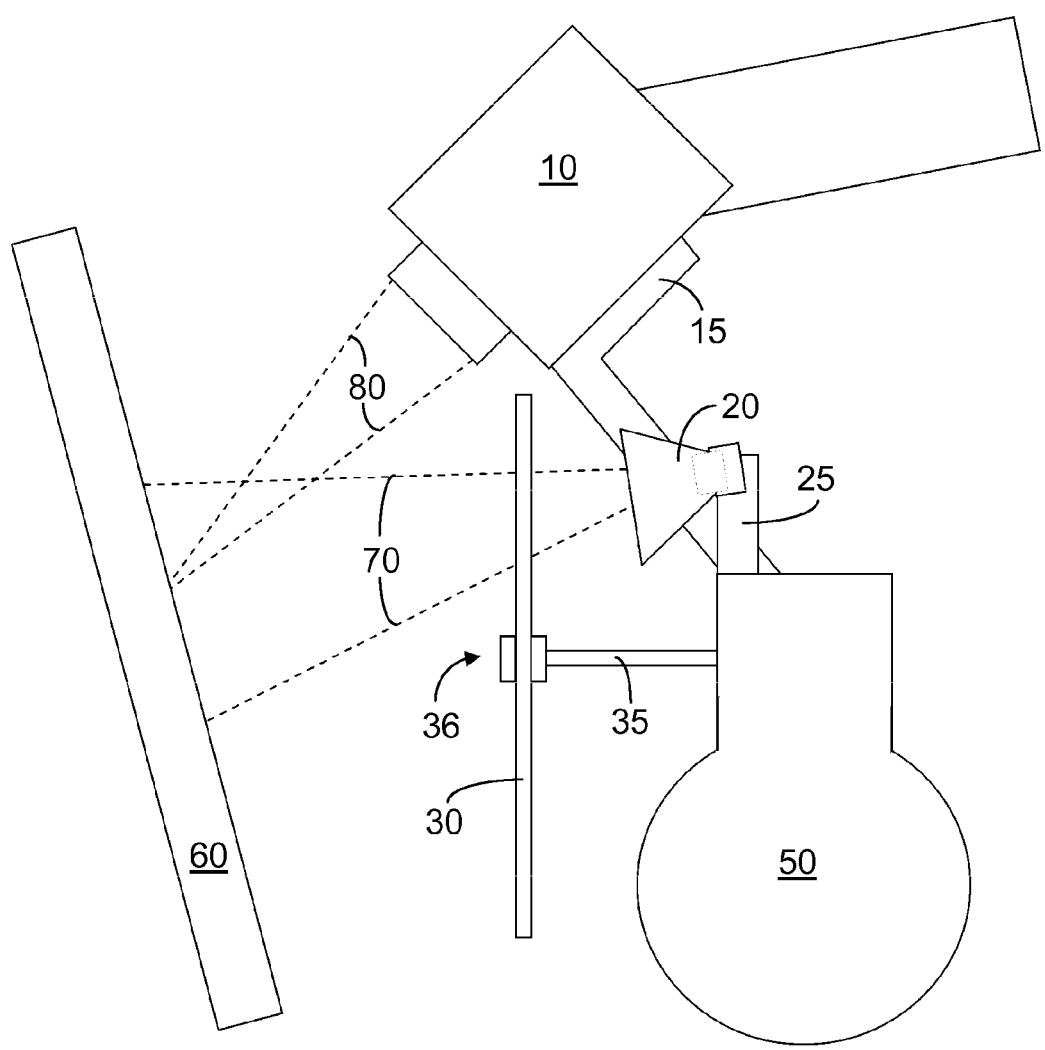
FIGS. 2-3 are schematics intended to explain of operation of the measuring arrangement of FIG. 1.
Figure 3:
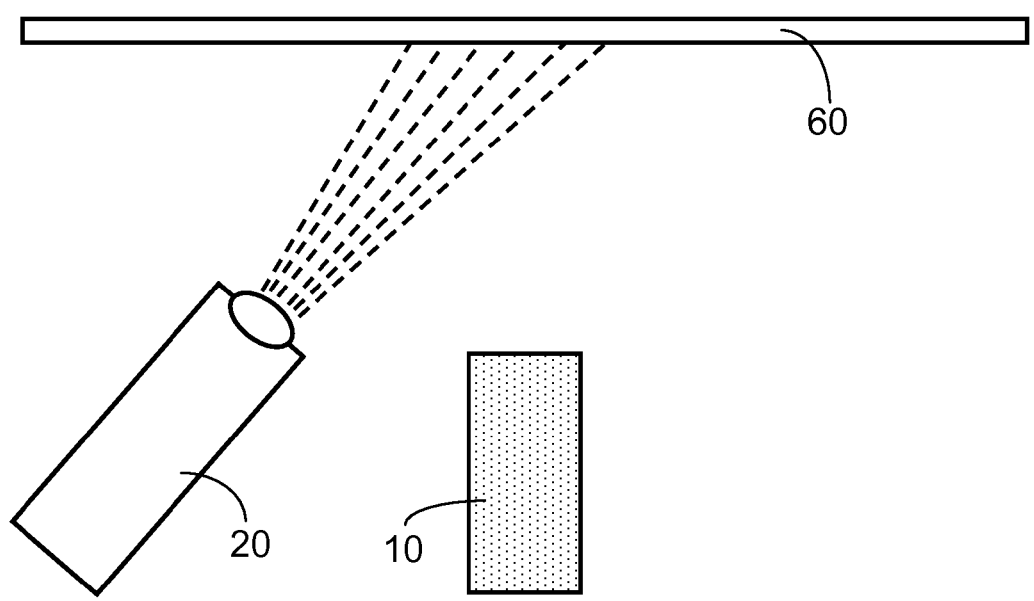

As best seen in FIG. 2, the non-contact thermometer 10 is positioned and oriented such that it can measure the temperature on a surface of a sample 60 beyond the edge of the rotatable screen 30, there typically being a spacing of a few (for example 5-20) cm from the surface to be characterized.

In order to ensure a measurement that is objective or independent of the color and transmission characteristics of the respective surfaces, a suitable homogenization or surface modification is carried out in advance on the sample 60, after which all the samples have corresponding color properties and surface structures. By way of example, a commercially available heat transfer paste, a sticker or tape with a suitable transmission behavior (preferably a low reflection factor), a suitable liquid (for example with two partial volumes of matt black color and one partial volume of isopropanol) or carbon black particles (for example stored in Teflon filters) can be applied for this purpose to the respective surfaces.

The determination of the contact temperature of a material to be examined, and/or the quantification of the temperature feel upon contact with the relevant surface are explained below with reference to FIG. 4 and FIGS. 5a-d.

A pulsed heating of the relevant surface may be carried out with the use of the arrangement illustrated in FIGS. 1a-b and FIG. 2, specifically in each case firstly for a series of reference samples for the purpose of calibrating the arrangement. The individual reference samples preferably comprise mutually differing materials (such as for example, foam, wood, plastic, or aluminum). A reference scale that is well known and commonly used for standardization and calibration in the automotive industry is known as the "sensotact" scale.

Figure 4:
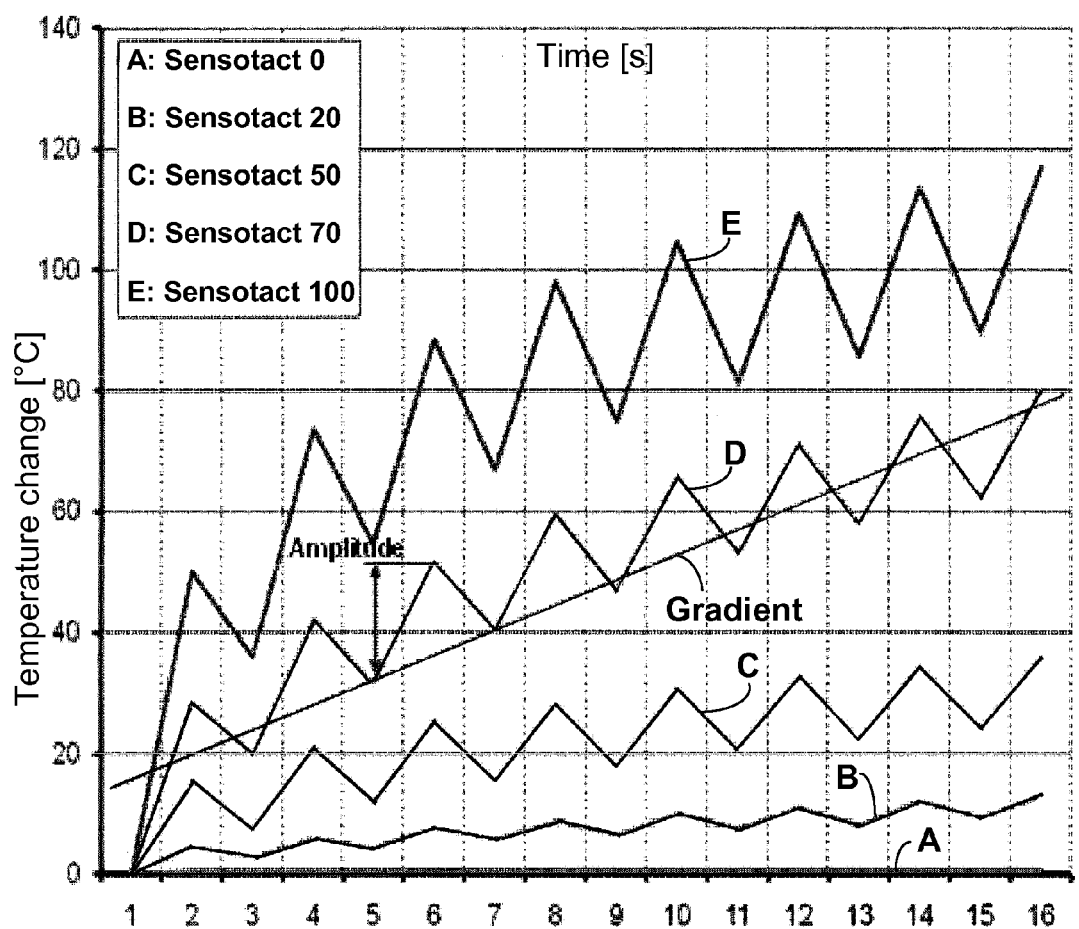
FIG. 4 is a time/temperature plot showing pulsed heating of five samples to establish reference values.

Heating by means of periodic pulsing is attained here by the openings 40 in the screen 30, which rotate in the arrangement of FIGS. 1a-b and FIG. 2, and yields (as seen in FIG. 4) characteristic sawtooth curves "A" to "E" for measurement of the temperature change as a function of time. Curves A through E correspond to five sensotact samples used for the calibration with the sample designations 0, 20, 50, 70 and 100. The pulsing can be selected in this case, purely as an example, such that recording can be conducted at a frequency of 1 Hz measured values.

In accordance with FIG. 4, the sawtooth curves A through E are used firstly to calculate the gradient of the regression line (through the curve of temperature change versus time), and secondly to calculate the amplitudes of the temperature decay curves of the individual temperature oscillations produced by the cycles of pulsed heating.

A comparative parameter or coefficient vl is then calculated from the average amplitude values and the value of the gradient as follows:

$$vl = \frac{1}{m \cdot a}, \qquad (1)$$

m denoting the gradient of the regression line, and a denoting the average amplitude of the temperature decay curves.

Furthermore, the reference samples used for the calibration have known values for the heat penetration coefficient b, which is defined as follows:

$$b = \frac{q_0}{\sqrt{\pi}} \cdot \frac{d(\sqrt{t})}{d\vartheta}, \qquad (2)$$

where $$q_o = \frac{Q}{A},$$

and b: heat penetration coefficient
$\theta_0$: temperature of the surface
Q: heat flow
A: heat transfer surface area.

Figure 5:
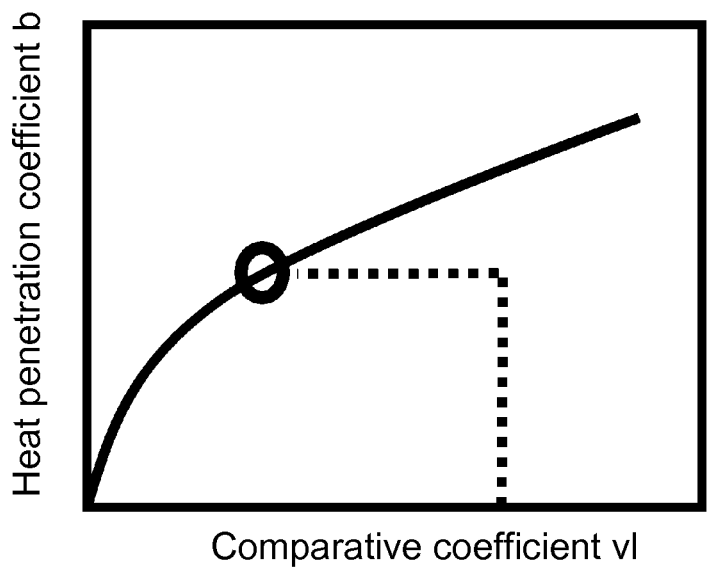
FIGS. 5a-5d are plots of relationships used to determine a temperature sensed upon contact with a surface.
Figure 5:
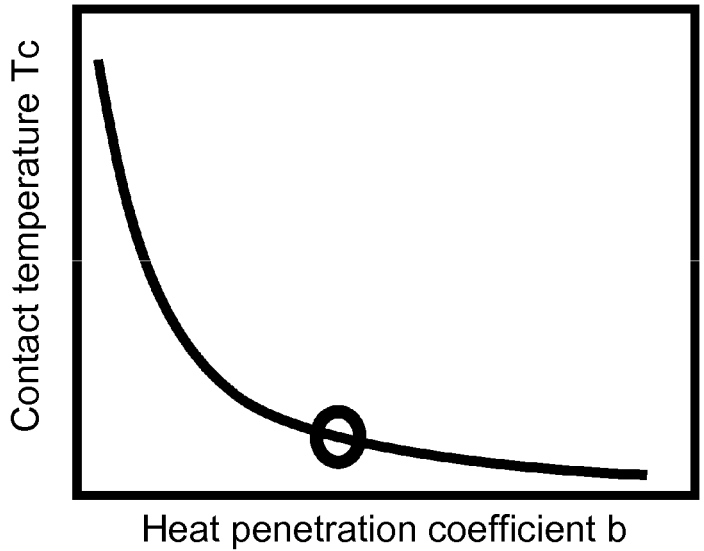
Figure 5:
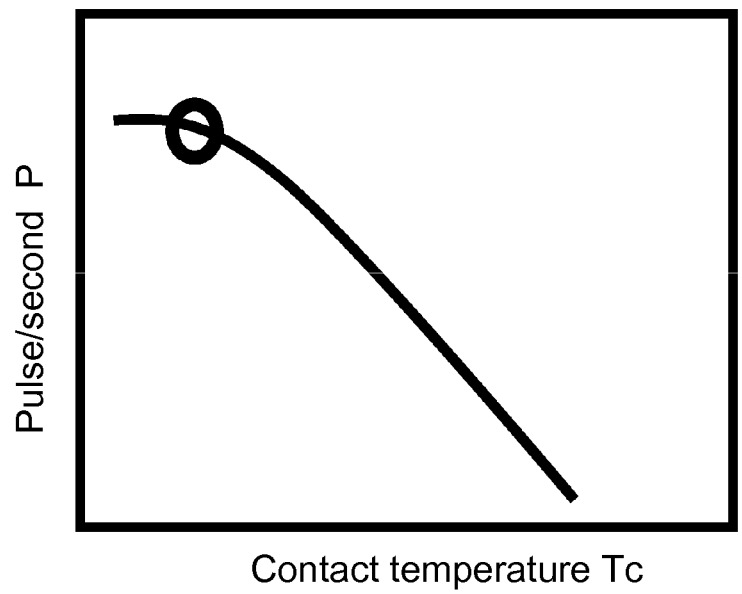
Figure 5:
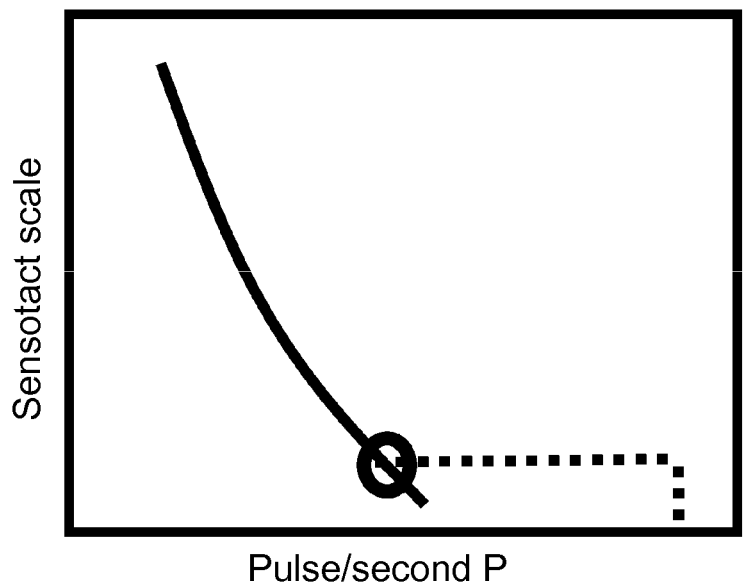

The coefficients vl determined respectively for each of the reference samples may be plotted versus the respective heat penetration coefficients b to yield the correlation illustrated in the graph of FIG. 5a. It is thus possible to use this correlation in a subsequent measurement to assign each comparative value of parameter vl a corresponding value for the heat penetration coefficient b, and thus a contact temperature $T_c$ of the material being examined, in accordance with FIG. 5b.

Since the contact temperature $T_c$ is directly correlated in turn with the human perception of temperature, it follows that a "temperature feel" for a material can be at least approximately quantified in the case of contact with different surfaces. This is illustrated in the schematics of FIGS. 5c and 5d where the number of pulses per second experienced by skin thermoreceptors (cold-sensing nerve cells) being assigned in FIG. 5c to the contact temperature $T_c$, and a corresponding scale value, for example on a scale from 0 (=cold) to 100 (=warm), being assigned to the thermoreceptor pulse rate in FIG. 5d for the purpose of characterizing the temperature sensed upon contact with a surface.

Although the invention can be used with particular advantage in the motor vehicle industry, the invention is not restricted thereto. Rather, the invention can be applied in all technical areas in which the perception of the quality of products (in particular their feel and palpability) is to be optimized, for example in the electronics or furniture industries.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A method for estimating a temperature sensed upon contact with a surface comprising:
   contactlessly applying pulsed heating to the surface;
   contactlessly measuring a temperature change of the surface over time resulting from the pulsed heating;
   determining a regression line for a function describing the temperature change;
   calculating a gradient m of the regression line;
   calculating a mean amplitude a of individual temperature oscillations produced by the pulsed heating;
   determining a value of a parameter (vl) for the surface defined as:

$$vl = \frac{1}{m \cdot a}; \text{ and}$$

estimating the temperature sensed upon contact by comparing the value of the parameter (vl) for the surface with a set of known values of the parameter for a respective set of reference materials.

2. The method of claim 1 further comprising modifying the surface in order to normalize a color and/or a transmission behavior of the surface.

3. The method of claim 2 wherein the surface is modified by applying at least one of a sticker, a tape, a liquid, a paste, and carbon black particles.

4. Apparatus for estimating a temperature sensed upon contact with a surface, comprising:

a heat source for applying pulsed contactless heating to the surface;
a thermometer for contactless measurement of a temperature of the surface; and
an evaluation unit determining a regression line for a function describing a temperature change over time during the pulsed heating, calculating a gradient m of the regression line, calculating a mean amplitude a of individual temperature oscillations produced by the pulsed heating, determining a value of a parameter (vl) for the surface defined as:

$$vl = \frac{1}{m \cdot a}; \text{ and}$$

estimating the temperature sensed upon contact by comparing the value of the parameter (vl) for the surface with a set of known values of the parameter for a respective set of reference materials.

5. The apparatus of claim 4, wherein the heat source comprises a rotatable screen having at least one opening, thermal energy being applied to the surface through the opening.

6. A method for estimating a temperature sensed upon contact with a surface comprising:
   applying pulsed heating to the surface;
   measuring a temperature change over time of the surface during the pulsed heating cycles;
   determining a regression line for a function describing the temperature change;
   calculating a gradient of the regression line;
   calculating a mean amplitude of individual temperature oscillations produced by the pulsed heating;
   performing a calibration utilizing a plurality of reference samples each having a respective known value of heat penetration coefficient, the calibration comprising assignment of a respective parameter to each respective value of the heat penetration coefficient known for each of the plurality of reference samples;
   generating correlations between the parameters of each reference sample, the respective heat penetration coefficient values of each reference sample, and respective contact temperatures of each reference sample; and
   estimating the temperature sensed upon contact based upon the correlations.

7. The method of claim 6 further comprising modifying the surface prior to the applying pulsed heating step in order to normalize a color and/or a transmission behavior of the surface.

8. The method of claim 7 wherein the surface is modified by applying at least one of a sticker, a tape, a liquid, a paste, and carbon black particles.

9. The method of claim 6, wherein the application of pulse heating is accomplished by a heat source comprising a rotatable screen having at least one opening, the heating being applied to the surface through the opening.

* * * * *